United States Patent [19]

Alsenz

[11] Patent Number: 4,612,776
[45] Date of Patent: Sep. 23, 1986

[54] METHOD AND APPARATUS FOR CONTROLLING CAPACITY OF A MULTIPLE-STAGE COOLING SYSTEM

[76] Inventor: Richard H. Alsenz, 2402 Creek Meadow Dr., Missouri City, Tex. 77459

[21] Appl. No.: 257,113

[22] Filed: Apr. 24, 1981

Related U.S. Application Data

[63] Continuation of Ser. No. 62,525, Jul. 31, 1979, abandoned.

[51] Int. Cl.[4] ............................................. F25B 7/00
[52] U.S. Cl. .................................... 62/175; 62/228.3; 236/1 EA
[58] Field of Search ................. 236/1 EA; 62/228 C, 62/228 D, 175; 307/39

[56] References Cited

U.S. PATENT DOCUMENTS

| | | | |
|---|---|---|---|
| 3,513,662 | 5/1970 | Golber | 62/175 X |
| 3,717,300 | 2/1973 | Evalds | 236/1 EA X |
| 3,844,475 | 10/1974 | Kesterson et al. | 165/26 X |
| 4,003,370 | 1/1977 | Emil et al. | 73/753 X |
| 4,184,341 | 1/1980 | Friedman | 236/1 EA X |

Primary Examiner—William E. Wayner
Attorney, Agent, or Firm—Arnold, White & Durkee

[57] ABSTRACT

In one exemplar embodiment, method and apparatus for controlling capcity of a multiple-stage cooling system is disclosed which utilizes means for establishing a single predetermined cooling stage "cut-in" pressure and a single predetermined cooling stage "cut-out" pressure, means for determining that the "cut-in" or "cut-out" pressures have been reached in the system, a delay means for introducing a selected minimum time delay after determining that the refrigerant fluid pressure has either reached the established "cut-in" or "cut-out" pressures, and control means for controlling the turning on or off of the next cooling stage after the time delay has elapsed.

24 Claims, 4 Drawing Figures fig.1 fig.2 fig.3 fig.4

METHOD AND APPARATUS FOR CONTROLLING CAPACITY OF A MULTIPLE-STAGE COOLING SYSTEM

CROSS-REFERENCE TO RELATED APPLICATIONS

This application is a continuation of U.S. patent application Ser. No. 062,525, filed July 31, 1979, entitled "Method and Apparatus for Controlling Capacity of a Multiple-Stage Cooling System", now abandoned.

TECHNICAL FIELD

This invention relates to a method and apparatus for increasing the average coefficient of performance of a multiple-stage refrigeration or cooling system.

In the past, the cycling of stages of a multiple-stage refrigeration or cooling system has been principally accomplished by setting each stage at a successively lower "cut-in" and "cut-out" pressure of the refrigerating fluid flowing in the suction line from the evaporator coil to the compressor(s) or cooling stages. The use of successively lower "cut-in" and "cut-out" pressure ranges for each cooling stage results in an average ranges for each cooling stage results in an average pressure which is lower than the mean pressure of the pressure differential between the "cut-in" and "cut-out" pressures of the highest stage. Various mechanical and electromechanical systems have been devised to attempt to solve this problem, primarily utilizing the successively lower pressure ranges for each successive cooling stage as described above.

BACKGROUND ART

Patents which are typical of the prior art for mechanically or electromechanically controlling refrigeration compressor capacity include the following U.S. Pat. Nos.: 3,885,938; 3,828,152; 3,719,057; 3,581,519; 3,580,006; 3,552,137; and 3,377,816. Increased efficiencies could be realized if each cooling stage could be controlled at a single highest "cut-in" and "cut-out" pressure levels that would insure adequate temperatures in the refrigerated space serve by the evaporator coils.

DISCLOSURE OF INVENTION

The present invention remedies the problems of the prior art by providing a method and apparatus for controlling the capacity of a multiple-stage refrigeration or cooling system through the inclusion of a selected minimum time delay after determining that the refrigerant fluid pressure has either reached an established "cut-in" or "cut-out" pressure before turning on or off the next cooling stage, while utilizing a single predetermined "cut-in" and "cut-out" pressure setting. The net result is an average in temperature in the cooling coil or pressure of the refrigerant fluid in the system which would be equivalent to the highest cooling stage in a conventional system utilizing successively lower "cut-in" and "cut-out" differentials for successive cooling stages. By inserting such a time delay before cutting-in or cutting-out a cooling stage, a single established "cut-in" or "cut-out" pressure can be utilized, resulting in a much larger cooefficient of performance.

In accordance with a principle of this invention, a method of controlling the capacity of a multiple-stage pressurized refrigerating fluid cooling system is disclosed which comprises the steps of establishing a selected cooling stage cut-in and cut-out pressure for the system, determining whether the cut-in or cut-out pressure has been reached in the system, introducing a selected minimum time delay subsequent to at least one of said pressure determinations, and controlling the turn on or turning off of the next cooling stage after the time delay has elapsed.

In accordance with a further principle of this invention, apparatus for controlling the capacity of a multistage pressurized refrigerating fluid cooling system is disclosed, comprising pressure selecting means for establishing a selected cooling stage cut-in and cut-out pressure for the system, pressure detection means adopted to cooperate with the refrigerating fluid in the system and with the pressure selecting means for determining that the cut-in or cut-out pressure has been reached in the system and providing an output signal in response thereto, delay means receiving the detection means output signal and in response thereto introducing a selected minimum time delay prior to providing an output control signal, and control means for controlling the turning on or off of the next cooling stage in response to the delayed control signal.

Accordingly, one primary feature of the present invention is to provide a method and apparatus for capacity control of a multiple-stage refrigeration or cooling system which utilizes only one "cut-in" and one "cut-out" pressure setting by establishing a time delay between the determination that the system pressure has reached the established "cut-in" and "cut-out" pressures and a subsequent application of a control signal to control the turning on or off of the next cooling stage.

Another feature of the present invention is to provide a capacity control method and apparatus for a multiple-stage refrigeration system which shuts off the stage which has been running the longest and turns on the stage which has been shut off the longest.

Yet another feature of the present invention is to provide a method and apparatus for capacity control of a multiple-stage refrigeration system which maximizes the co-efficient of performance over prior art methods and apparatus.

Still another feature of the present invention is to utilize a solid state apparatus for controlling capacity of a multiple-stage refrigeration system that can "cut-in" and "cut-out" successive cooling stages in a predetermined sequence to more evenly divide the operating time of the cooling stages in the system.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments. In the drawings.

BEST MODE FOR CARRYING OUT THE INVENTION

Figure 1:
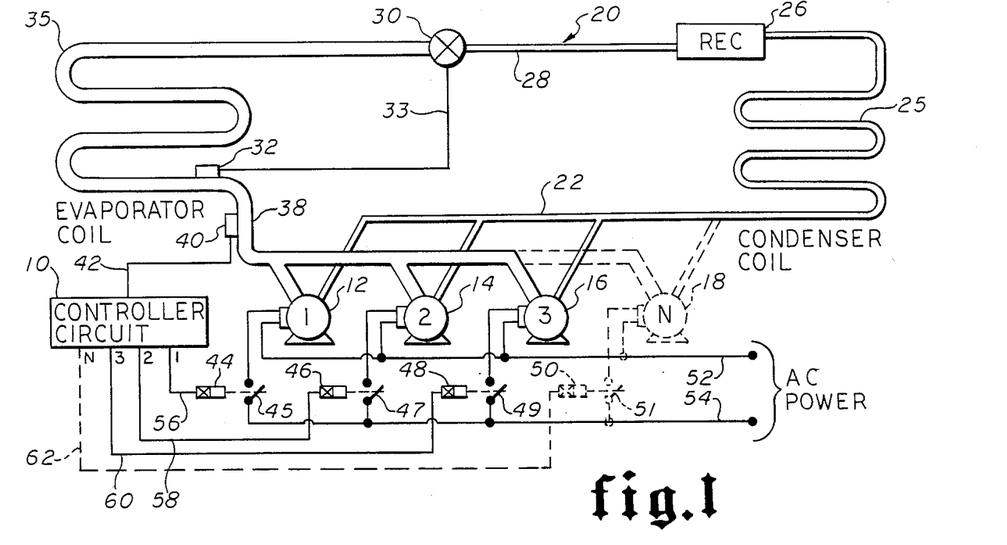
FIG. 1 is a simplified schematic of a multiple-stage cooling or refrigeration system including the capacity control apparatus according to this invention.

Referring now to FIG. 1, the refrigeration system capacity controller circuit 10 is shown disposed in a multiple-stage refrigeration or cooling system 20 consisting of a plurality of refrigerant compressors 12, 14, 16, and 18 for discharging compressed pressurized refrigerant vapor through discharge line 22 to a condenser coil 25 where the pressurized refrigerant vapor is condensed to a liquid and then delivered to a receiver vessel 26. From the receiver 26, the liquid refrigerant flows through line 28 and through an expansion device or valve 30, typically a mechanical expansion valve responding to the temperature in suction line 38 as sensed by temperature sensing device 32. The temperature signal from sensor 32 is applied to valve 30 through conductor 33 to initiate the expansion valve action. The liquid refrigerant is injected through expansion device 30 into the evaporator coil 35 where the liquid refrigerant, encountering the low pressure of the evaporator coil, boils and evaporates thus absorbing heat from the evaporator coil. The hot vaporized refrigerant from the evaporator coil is drawn through suction line 38 to the inlet ports of the multiple compressors 12–18. The number of compressors to be staged in the system varies according to the refrigerating or cooling system load. In FIG. 1, three compressors are shown as 12, 14 and 16 and an "N"th number of compressors is shown in dotted lines by compressor 18.

A pressure transducer 40 is attached to the suction line 38 and determines the refrigerant vapor pressure within suction line 38 and generates an electrical signal representative of the measured pressure. The signal is applied through conductor 42 as an input to the capacity controller circuit 10, which will be hereinafter described in greater detail. The output of the controller circuit 10 is a plurality of outputs corresponding to the number of the plurality of cooling stages or compressors staged in the system. Accordingly, there are a corresponding "N" number of outputs from the capacity controller circuit 10 labelled 1, 2, 3 and N. The controller circuit output 1 is applied through conductor 56 to the coil of a relay 44 which controls relay switch contacts 45 for applying AC power via conductors 52 and 54 to the first compressor 12 for energizing the compressor when it is desired to cut the compressor into the system. Similarly, the 2, 3 and N outputs of the capacity controller circuit are applied in tandem through conductors 58, 60 and 62, respectively, to the coils of relays 46, 48 and 50, respectively, for successively closing switches 47, 49 and 51, respectively, for successively applying AC electrical power to the 2, 3 and N compressors, respectively, for either turning on or turning off the compressors in a staged sequence.

Figure 2:
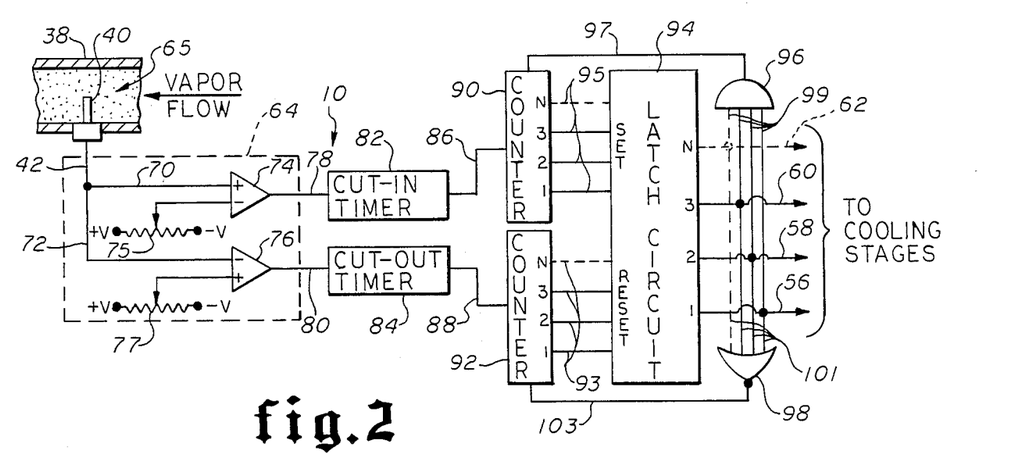
FIG. 2 is a block diagram schematic of the capacity controller circuit shown in FIG. 1.
Figure 4:
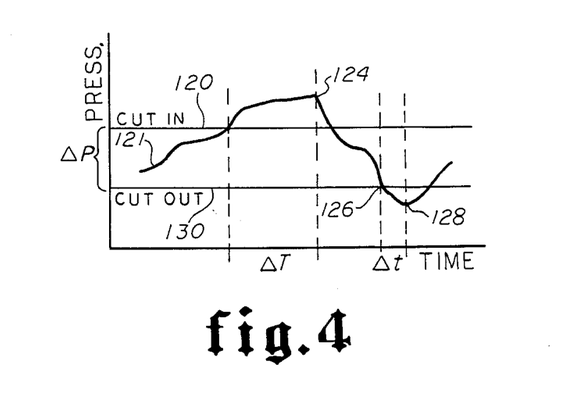
FIG. 4 is a graphical representation of the refrigerating fluid pressure vs. time of a multiple-stage refrigeration or cooling system load operating within the parameters of the capacity control method and apparatus according to the present invention.

Referring now to FIGS. 1, 2 and 4, the operation of the capacity controller circuit 10 will be described in greater detail. The pressure detecting means or transducer 40 is shown sealingly inserted into the refrigerant vapor flow 65 in suction line tubing 38. Pressure transducer 40 may be any conventional pressure detecting means for generating an electrical signal representative of the pressure within line 38. The pressure signal from transducer 40 is applied through conductors 42 and 70 to the positive input of a comparator circuit 74, and through conductors 42 and 72 to the negative input of a second comparator circuit 76. To set a predetermined "cut-in" pressure for the system, a voltage potential is applied through a voltage varying means such as a potentiometer 75 of the negative input of the comparator circuit 74. Similarly, a voltage is applied through a voltage varying means such as potentiometer 77 to the positive input of the comparator circuit 76 to set a predetermined "cut-out" pressure for the system. Comparator circuit 74 compares the predetermined cooling system "cut-in" pressure (set by potentiometer 75) against the suction line pressure continuously detected by pressure transducer 40 and produces a "cut-in" electrical signal when the measured pressure exceeds the predetermined "cut-in" pressure. Comparator circuit 76 compares the predetermined cooling system "cut-out" pressure (set by potentiometer 77) against the pressure continuously detected by the pressure transducer 40 and produces a "cut-out" electrical signal when the detected system pressure exceeds the predetermined "cut-out" pressure. The combination of transducer 40, potentiometers 75 and 77 for establishing system pressure "cut-in" or "cut-out" pressure levels and the comparators 74 and 76 also comprise detection means 64 for establishing a selected cooling stage "cut-in" or "cut-out" pressure and determining when those established pressures have been reached and providing an output signal in response thereto, i.e., output of comparators 74 or 76.

The "cut-in" signal of comparator 74 is applied through conductor 78 to a timer circuit 82 which generates an output electrical control signal after a first predetermined minimum time delay. The delayed time output control signal is applied through conductor 86 as an input to a counter 90. Counter 90 is a conventional counter circuit that generates a successive plurality of outputs 1 to N corresponding to the number of staged compressors in the system. Each delayed control signal received from timer 82 by counter 90 will cause a counter output signal to appear at one of the series of successive counter outputs 1, 2, 3 or N in repetitive succession, and are applied via a conductor 95 as a "set" input to a latch circuit 94.

The latch circuit 94 is of conventional solid-state design and generates a series of repeatable successive "cut-in" electrical control signals at outputs 1, 2, 3 and N, to be applied in tandem through conductors 56, 58, 60 and 62, respectively, to a series of repeatable successive compressor control relays 44, 46, 48 and 50, respectively, in response to successive "set" input signals received via conductors 95 from the 1, 2, 3 or N outputs of counter 90. For example, if the counter 90 has an output signal at output 1 applied through a conductor 95 as a "set" input to latch circuit 94, latch circuit 94 will generate a control signal output voltage at its 1 output (conductor 56). Similarly, output signals from counter 90 appearing in a series successively at 2, 3 and N are applied through conductors 95 as repeatable successive "set" inputs to latch circuit 94, thereby generating "cut-in" or turn on control signals appearing at outputs 2, 3 and N (conductors 58, 60 and 62, respectively). The electrical control signals are voltages applied in tandem through conductors 56, 58, 60 and 62, respectively to relays 44, 46, 48 and 50, respectively, as hereinabove described for successively energizing the relays 44, 46, 48 and 50, respectively, and successively energizing or turning on one of the multiple compressors 12, 14, 16 and 18, respectively.

Similarly, the "cut-out" output signal of comparator 76 is applied through conductor 80 to a timer 84. Timer circuit 84 generates a delayed "cut-out" electrical control signal after a predetermined time delay. The control signal is applied through conductor 88 as an input to another counter circuit 92. Counter 92 may be identical to the counter 90 hereinabove described. Each successive delayed "cut-out" control signal received from timer circuit 84 generates one of a series of repeatable successive electrical signals at counter 92 outputs 1, 2, 3 and N, which are applied through conductors 93 as "reset" inputs to latch circuit 94. Receipt of the successive series of delayed "cut-out" control signals from counter 92 causes the latch circuit 94 to be reset in the succession in which the counter signals are received.

For example, upon receipt of a counter 92 output 1 signal applied through conductor 93 as a "reset" input to latch circuit 94, the latch 94 output at 1 will be reset and no voltage will appear on conductor 56 thus de-energizing relay 44, opening relay switch contacts 45 and "cutting-out" the first compressor 12, which has run the longest. Accordingly, successive counter 92 signals received from outputs 2, 3 and N as "reset" inputs to latch circuit 94 will successively reset the latch circuit and remove the latch circuit voltage outputs appearing at lines 2, 3 and N (conductor 58, 60 and 62, respectively), for "cutting-out" compressors 14, 16 and 18 in succession.

In addition, the latch circuit outputs 1, 2, 3 and N (conductors 56, 58, 60 and 62, respectively) are also connected by conductors 99 as inputs to a conventional AND gate 96. When all of the latch circuit outputs 1, 2, 3 and N have positive output voltages appearing thereon, the AND gate 96 generates an output signal applied through conductor 97 to counter 90 to disable counter 90 at its last count and prevent further delayed "cut-in" electrical signals received from timer 82 from generating further counter 90 output electrical signals for application to the latch circuit 94. Similarly, the latch circuit outputs 1, 2, 3, and N are also connected by means of conductors 101 as inputs to a conventional NOR gate 98. NOR gate 98 will generate an electrical output signal to be applied through conductor 103 to disable counter 92 when all of the latch circuit outputs 1, 2, 3 and N have been reset and there are no output voltage signals present thereon. The electrical signal received from NOR gate 98 disables counter 92 and prevents any further "cut-out" delayed signals received from timer 84 from triggering any further counter 92 output signals to be applied as reset inputs to latch circuit 94.

The operation of the capacity controlling circuit 10 can now further be described with reference to FIGS. 1, 2 and 4. The graph of FIG. 4 depicts the system refrigerating fluid vs. time and is represented by pressure trace 121. The selected "cut-in"]pressure represented by line 120 is set for the system by potentiometer 75 as one input to the comparator 74, as hereinabove described. The selected "cut-out" pressure represented by line 130 is set by potentiometer 77 as one input to comparator 76, as hereinabove described. The desired system suction line pressure range $\Delta P$ has been selected for optimum efficiency of the system. The timer 82, as hereinabove described, establishes a predetermined delay time which is represented by the time interval $\Delta T$, and the delay time established by timer circuit 84 is represented by the shorter time interval $\Delta t$. Assuming that compressors 1 and 2 are operating in the system within the $\Delta P$ established by "cut-in" pressure (120) and the "cut-out" pressure (130), if the refrigerator load increases, then the suction line pressure will rise. If the load is heavy enough, the pressure (121) will rise until it exceeds the predetermined value established by potentiometer 75 (line 120) at point 122 and comparator 74 will generate an electrical "cut-in" signal to be applied to the timer 82.

The comparator signal output occurs at point 122 which is the point at which the suction line pressure 121 rises above or exceeds the predetermined cut-in system pressure and establishes the beginning of the delay time $\Delta T$ of timer 82. The suction pressure may continue to rise as shown in FIG. 4 until timer 82 generates its delayed "cut-in" electrical control signal which is applied to counter 90, and since compressors 1 and 2 are already operating, counter 90 will generate an output signal at output 3 which is then applied through a conductor 95 as a "set" input to latch circuit 94. Receipt of the delayed "cut-in" signal from output 3 of timer 82 by the latch circuit 94 causes a positive voltage to appear at latch output 3 (conductor 60) which is applied to relay 48 for energizing the relay, closings relay switch 49 and "cutting-in" the third compressor 16, which has been "turned off" the longest time period. The end of the predetermined time delay, $\Delta T$, established by timer 82, occurs at point 124, and the third compressor or cooling stage now in the system adds cooling capacity and returns the pressure to the operating pressure differential $\Delta P$ range established by pressures 120 and 130. In the event that the combined operating capacity of compressors 12, 14 and 16 is still insufficient for the load, the suction pressure will not drop below the cut-in pressure (120) and cut-in timer 82 will generate another delayed "cut-in" signal to cut-in another compressor stage, up to the Nth stage to match the load demand.

In the event the suction pressure (121) declines because of over-capacity in the system, and falls below the predetermined "cut-out" pressure represented by line 130, then comparator 76 will generate a "cut-out" signal applied to the timer 84 occuring at point 126, which begins the established time delay $\Delta t$. When the predetermined time delay $\Delta t$ has elapsed, timer 84 generates a "cut-out" electrical control signal applied through conductor 88 as an input to the counter 92. The counter 92, in response to the received signal, will generate an output signal on line 1 applied through a conductor 93 to latch circuit 94 as a "reset" input. The counter reset signal applied to latch circuit 94 will "reset" output line 1 of the latch circuit, thereby removing the positive voltage output at conductor 56 and de-energizing relay 44, opening switch contacts 45 and "cutting-out"]compressor 12 (which has been operating the longest time period) from the system, as reflected at 128, the end of the delay $\Delta t$ and the point where the suction pressure again begins to increase. When compressor 12 is "cut-out" of the system, the suction line pressure begins to increase until it returns to the desired operating range between the pressure differentials 120 and 130. Similarly, in the event that the combined operating capacity of the compressors or cooling stages still exceeds the load, another "cut-out" signal will be generated by timer 84 to "cut-out" another compressor stage until the operating stage capacity matches the system load.

In this way the multiple staged compressors can be "cut-in" or "cut-out" of the system to increase or decrease refrigeration capacity depending on the system refrigeration load by a discrete combination of compressor stages, thus matching as closely as possible the available compressor stage capacity with the system load. The compressor that has operated the longest will always be the first to be "cut-out" when the system capacity needs diminish, and the compressor that has not operated the longest will be the next to be "cut-in" when the system capacity needs increase.

The timers 82 and 84 and counters 90 and 92 "remember" the length of their respective time delays, $\Delta T$ and $\Delta t$. For example, referring to FIGS. 1, 2 and 4, if $\Delta T$ is five (5) minutes, and $\Delta t$ is five (5) seconds, if suction pressure 121 rises above the "cut-in" pressure (120) at point 122, the five (5) minute $\Delta T$ period begins. However, if suction pressure trace 121 had dropped back below "cut-in" pressure 120 after only two (2) minutes had elapsed (or before reaching point 124), the "cut-in" signal from comparator 74 will cease, disabling timer 82. Similarly, if suction pressure trace 121 falls below the "cut-out" pressure 130 as at point 126, the five (5) second $\Delta t$ period begins. However, if the suction pressure (121) increases and rises above "cut-out" pressure (130) after only three (3) seconds, the "cut-out" signal from comparator 76 will cease and disable timer 84, and no delayed "cut-out" signal will be sent to counter 92. Accordingly, no delayed "cut-in" signal will be addressed to counter 90. Therefore, no additional compressor or cooling stage will be "cut-in", but the next time the suction pressure 121 exceeds the "cut-in" pressure, timer 82 will again be energized and will produce a delayed "cut-in" signal after only three (3) minutes (the balance of $\Delta T$ left over from the last $\Delta T$ period) and "cut-in" or turn on the next compressor or cooling stage of the system. Similarly, the next time the pressure trace 121 decreases to fall below the "cut-out" pressure, timer 84 will again be enabled and will produce a delayed "cut-out" signal after only two (2) seconds (the balance of $\Delta t$ left over from the last $\Delta t$ period) and "cut-out" or turn off the compressor which has run the longest.

As above described, it will be evident that controller circuit 10 will "cut-in" or "cut-out" the next compressor or compressor stage as above described until the combination of stages has an operating capacity closest to matching the system load, i.e., causing the system suction pressure to return to the previously established $\Delta P$ range as hereinabove described and shown in FIG. 4. For example, if the compressors 12, 14 and 16 are the only compressors in the system, then the capacity controller 10 will select and provide increased or decreased compressor capacity in combinations to most closely match the load demand. The various possible combinations of compressors 12, 14 and 16 will be 12 alone, 12-14, 12-14-16, 12-16, 14-16, 14 alone or 16 alone.

Similarly, if the compressors 12, 14 and 16 are unequal in capacity and rate at 1, 2 and 4 horsepower (HP), respectively, then it has been found that the capacity controller 10 will select and provide increased or decreased compressor horsepower capacity in discrete increments or combinations to match the load demand. Assuming the above described ratings of 1, 2 and 4 HP for compressors 12, 14 and 16, then the various possible combinations of those compressors will provide capacities of 1, 2, 3, 4, 5, 6 and 7 HP in response to changing load demand. The number of combinations for multiple compressors whether of equal or unequal capacity will always be larger than the number of compressors or compressor stages in the system. It will be further evident from the above described operation and drawings showing multiple compressors 12, 14, 16-18 (1, 2, 3 to N number of compressors) that any number of compressors can be controlled, such as a system of two (compressors 12 and 14), a system of three (compressors 12, 14 and 16) or a system of N number (compressors 12, 14, 16-N).

The refrigeration capacity control invention herein disclosed may also be utilized in controlling multple-stage refrigeration or cooling systems having multicylinder compressors that are staged by controlling the compression of a plurality of compressor cylinders using conventional control valves by having controller 10 outputs control the utilization of the cooling stages by controlling the cylinders used by the compressors in the system. In addition, it is important to understand that while the system above described in FIGS. 1, 2 and 4 uses a separate time delay after determination of the reaching of the established "cut-in" or "cut-out" pressures, only a single time delay is necessary to enable selection of successive cooling stages utilizing a single selected "cut-in" system pressure and a single selected "cut-out" system pressure. For instance, in FIG. 2, the output of "cut-out" comparator 76 could be applied to timer 82 and utilize a single delay time for both "cut-in" and "cut-out" determinations. Further, the $\Delta P$ differential between "cut-in" pressure 120 (FIG. 4) and "cut-out" pressure 130 may be large or small, depending on the system design and the best system operating pressure. In certain systems, the $\Delta P$ could be set at zero, with the "cut-in" and "cut-out" pressures being established at the same valve.

Figure 3:
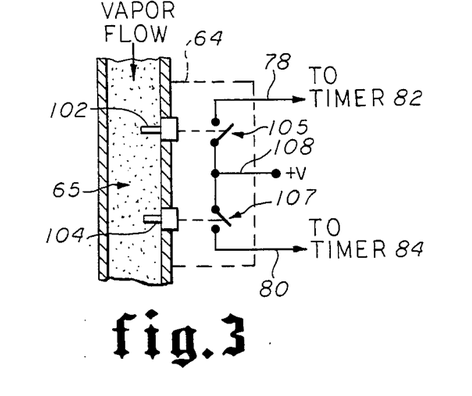
FIG. 3 is a partial schematic representation of another embodiment of a pressure detection means for determining when a selected system "cut-in" and "cut-out" pressure has been reached.

Another embodiment of the detecting means 64 is shown in FIG. 3. A pair of pressure switches 102, 104 are sealingly disposed in line 38 in contact with the pressurized refrigerating fluid vapor 65 flowing therein. The pressure devices 102 and 104 may be preset to operate at preset selected established "cut-in" and "cut-out" pressures, respectively, detected in line 38. When pressure switch 102 detects pressure exceeding the established "cut-in" pressure, it is actuated and operates switch contacts 105 to apply a voltage signal via conductors 108 and 78 to timer 82 for the purposes hereinabove described. Similarly, when pressure switch 104 detects pressure below the established "cut-out" pressure, it is actuated and operates switch contacts 107 to apply a voltage signal via conductors 108 and 80 to timer 84 for the purposes hereinabove described. Accordingly, the means of establishment of the single selected system "cut-in" and "cut-out" pressures and the determination of reaching those pressures can be combined, thus eliminating the need for the comparator circuits 74 and 76 and the potentiometers 75 and 77.

While the above description of the preferred embodiments has been made with particular reference to a multiple-stage refrigeration system using staged compressors or staged multiple-cylinder compressors, it should be appreciated that the capacity controlling method and apparatus herein described may be utilized in controlling the capacity of any multiple-stage cooling system such as air-conditioning systems utilizing chilled water and the like, by controlling cooling stages in those systems by controlling utilization of water circulating pumps or controlling the utilization of vanes in centrifugal pumps and the like. Accordingly, numerous variations and modifications may be made in the methods and structure herein described without departing from the present invention.

I claim:

1. A method of controlling a compressor system having a preselected number of commonly piped compressors of inequal capacity and a common suction pressure load, comprising the steps of
   establishing an operation suction pressure range having an upper limit and a lower limit,
   detecting the suction pressure in the system and determining when said pressure exceeds said upper limit and when said pressure is below said lower limit,
   providing an increase capacity signal when said operating suction pressure exceeds said upper limit and a decrease capacity signal when said operation suction pressure is below said lower limit, and
   selectively energizing and deenergizing compressors in response to the respective increase capacity signals and the decrease capacity signals to provide a combination of energized unequal capacity compressors that exceeds in number the preselected number of compressors in the system so that the capacity of the system matches the common pressure load.

2. The method as described in claim 1, further including the step of providing a time delay prior to energizing or de-energizing a subsequent compressor in the system.

3. A compressor system, comprising
   a preselected number of commonly piped compressors of unequal capacity having a common suction pressure load,
   pressure selecting means for establishing an operating suction pressure range having an upper limit and a lower limit,
   detection means for sensing the suction pressure in the system and cooperating with said pressure selecting means for determining when said pressure exceeds said upper limit and providing an increase capacity signal in response thereto and when said pressure is below said lower limit and providing a decrease capacity signal in response thereto,
   selection means for receiving said increase capacity signals and said decrease capacity signals and in respective response thereto selectively energizing and deenergizing said compressors to provide a combination of energized unequal capacity compressors that exceeds in number the preselected number of compressors in the system so that the capacity of the system matches the common pressure load.

4. The system as described in claim 3, wherein said pressure selecting means comprises
   a voltage source, and
   at least one variable resistance means connected to said voltage source for supplying a voltage signal representative of each of said operating suction pressure range limits.

5. The system as described in claim 4, wherein said detection means comprises
   a pressure transducer cooperating with the system suction pressure for measuring said pressure and generating an electrical signal representative of the measured pressure, and
   a comparator circuit receiving said voltage signals representative of said operation suction pressure range limits and said transducer signal for comparing said transducer signal with said pressure limit voltage signals for determining when said transducer signal indicates it is outside of said operating suction pressure range limits and generating increase capacity and decrease capacity signals in response thereto.

6. The system as described in claims 3, wherein said selection means comprises
   sequencing means connected to said detection means for establishing a first-off first-on sequence for energizing the compressors in response to an increase capacity signal and for establishing a first-on first-off sequence for deenergizing the compressors in response to a decrease capacity signal, and
   control circuit means connected to said sequencing means for tandemly connecting energizing signals to said compressors in a first-off first-on sequence and tandemly disconnecting said energizing signals from said compressors in a first-on first-off sequence.

7. The system as described in claims 3, further including time delay means for providing a time delay prior to energizing or de-energizing a subsequent compressor in the system.

8. The system as described in claim 7, wherein said time delay means comprises a timing circuit for receiving said cut-in and cut-out output signals from said detection means and in response thereto generating delayed cut-in or cut-out output signals applied to said sequencing means.

9. Apparatus for controlling the capacity of a preselected number of commonly piped compressors, comprising:
   pressure selecting means for establishing an operating suction pressure range having an upper limit and a lower limit, said pressure selecting means having a voltage source, and at least one variable resistance means connected to said voltage source for supplying a voltage signal representative of each of said operating suction pressure range limits,
   detection means for sensing the suction pressure in the system and cooperating with said pressure selecting means for determining when said pressure exceeds said upper limit and providing an increase capacity signal in response thereto and when said pressure is below said lower limit and providing a decreased capacity signal in response thereto,
   sequencing means connected to said detection means for establishing a first-off first-on sequence for energizing the compressors in response to an increase capacity signal and for establishing a first-on first-off sequence for deenergizing the compressors in response to a decrease capacity signal, and
   control circuit means connected to said sequencing means for tandemly connecting energizing signals to said compressors in a first-off first-on sequence and tandemly disconnecting said energizing signals from said compressors in a first-on first-off sequence.

10. The apparatus as described in claim 9, wherein said detection means comprises
    a pressure transducer for measuring said suction pressure and generating an electrical signal representative of the measured pressure, and
    a comparator circuit receiving said voltage signals representative of said operation suction pressure range limits and said transducer signal for comprising said transducer signal with said pressure limit voltage signals for determining when said transducer signal is outside of said operating suction pressure range limits and generating increase capacity and decrease capacity signals in response thereto.

11. The apparatus as described in claim 10, wherein said sequencing means comprising counting means receiving said increase capacity and decrease capacity signals from said detection means and generating in response to each of said received signals an energizing or a deenergizing control signal, said energizing control signals occurring in a first-off first-on sequence and said deenergizing control signals occurring in a first-on first-off sequence.

12. The apparatus as described in claim 11, wherein said control circuit means comprises
   circuit means receiving each of said energizing control signals and generating in response thereto a signal for energizing a compressor, said circuit means further receiving each of said deenergizing control signals and generating in response thereto a signal for deenergizing a compressor, and
   relay means cooperating with each of the compressors for receiving said energizing and deenergizing signals from said circuit means and energizing or deenergizing the corresponding compressor in response thereto.

13. A compressor system, comprising:
   (a) a preselected number of compressors of unequal capacity having a common suction pressure load;
   (b) a voltage source;
   (c) at least one variable resistance means connected to said voltage source for supplying a voltage signal representative of each of the operating suction pressure range limits;
   (d) a pressure transducer cooperating with the system suction pressure for measuring said pressure and generating an electrical signal representative of the measured pressure;
   (e) a comparator circuit receiving said voltage signals representative of said operating suction pressure range limits and said transducer signal for comparing said transducer signal with said pressure limit voltage signals for determining when said transducer signal is outside of said operating suction pressure range limits and generating increase capacity and decrease capacity signals in response thereto;
   (f) strategy means receiving said increase capacity or decrease capacity signals from said comparator circuit and generating in response to each of said received signals an energizing or a deenergizing control signal; and
   (g) control circuit means connected to said strategy means for tandemly connecting energizing signals to said compressors in a first-off first-on sequence and tandemly disconnecting said energizing signals from said compressors in a first-on first-off sequence.

14. An apparatus for controlling the capacity of a preselected number of compressors having a common suction pressure load, comprising:
   (a) a voltage source;
   (b) at least one variable resistance means connected to said voltage source for supplying a voltage signal representative of each of the operating suction pressure range limits;
   (c) a pressure transducer cooperating with the system suction pressure for measuring said pressure and generating an electrical signal representative of the measure pressure;
   (d) a comparator circuit receiving said voltage signals representative of said operation suction pressure range limits and said transducer signal for comparing said transducer signal with said pressure limit voltage signals for determining when said transducer signal is outside of said operations suction pressure range limits and generating increase capacity and decrease capacity signals in response thereto;
   (e) strategy means receiving said increase capacity and decrease capacity signals from said comparator circuit and generating in response to each of said received signals an energizing control or a deenergizing control signal, said energizing control signals occurring in a first-off first-on sequence and said deenergizing control signals occurring in a first-on first-off sequence; and
   (f) control circuit means for tandemly connecting said energizing control signals to said compressors in a first-off first-on sequence and tandemly disconnecting said energizing signals from said compressors in a first-on first-off sequence to provide a combination of energized compressors that exceeds in number the preselected number of compressors in the system and so that the capacity of the system matches the suction pressure load.

15. The system as described in claims 13 or 14, wherein said control circuit means comprises:
   (a) circuit means for receiving each of said energizing control signals and generating in response thereto a signal for energizing a corresponding compressor, said circuit means further receiving each of said deenergizing control signals for generating in response thereto a signal for deenergizing a corresponding compressor; and
   (b) relay means cooperating with each of the compressors for receiving said energizing and deenergizing signals from said circuit means and energizing or deenergizing the corresponding compressor in response thereto.

16. A compressor system, comprising:
   (a) a preselected number of compressors of unequal capacity having a common suction pressure load;
   (b) pressure selecting means for establishing an operating suction pressure range;
   (c) detection means for sensing the pressure in the system and cooperating with said pressure selecting means for determining when the limits of said operating pressure range have been exceeded and providing a increase capacity or decrease capacity signal in response thereto;
   (d) strategy means receiving said increase capacity or decrease capacity signals from said detection means and generating in response to each of said received signals an energizing or deenergizing control signal, said energizing control signals occurring in a first-off first-on sequence and said deenergizing control signals occurring in a first-on first-off sequence; and
   (e) control circuit means for applying said energizing control signal to the deenergized compressor that was the first to be deenergized and applying said deenergized control signal to the energized compressor that was the first to be energized for increasing or decreasing the capacity of the system to match the system load.

17. The system as described in claims 16, wherein said control circuit means comprises:
   (a) circuit means receiving each of said energizing control signals and generating in response thereto a signal for energizing a corresponding compressor, said circuit means further receiving each of said deenergizing control signals and generating in response thereto a signal for deenergizing a corresponding compressor; and
   (b) relay means cooperating with each of the compressors for receiving said energizing and deenergizing signals from said circuit means and energizing or deenergizing the corresponding compressor in response thereto.

18. An apparatus for adjusting the capacity of a commonly-piped multi-compressor cooling system to maintain common suction pressure within preselected limits, comprising:
   (a) measurement means for detecting the level of suction pressure in the cooling system and generating an increase capacity signal if the suction pressure exceeds the preselected limits and for generating a decrease capacity signal if the suction pressure drops below the preselected limits;
   (b) strategy means for generating an energizing signal for the compressor which has been turned off the greatest period of time in response to an increase capacity signal from said measurement means and for generating a deenergizing signal for the compressor which has been turned on the greatest period of time in response to a decrease capacity signal from said measurement means; and
   (c) switch means connected to each of the compressors for receiving said increase capacity signals and decrease capacity signals and for independently energizing a compressor selected by said strategy means in response to an increase capacity signal and for independently deenergizing a compressor selected by the strategy means in response to a decrease capacity signal, whereby a new combination of energized compressors is created out of a total number of combinations greater than the number of compressors available so as to match the system capacity to the cooling load,
   (d) said switch means including latching means connected to a plurality of actuation means, said latching means generating a continuous separate output voltage to at least one actuation means in response to increase capacity signals received from said strategy means and maintaining an output voltage, said latching means discontinuing at least one of said output voltages in response to decrease capacity signals received from said strategy means, each of said actuation means for energizing a separate compressor in response to an output voltage received from said latching means and for deenergizing the compressor in the absence of said output voltage from said latching means.

19. The apparatus of claim 18, further including logic means for preventing the transmission of an increase capacity signal by said strategy means when all of the compressors are energized and for preventing the transmission of a decrease capacity signal by said strategy means when all of the compressors are deenergized.

20. A method for adjusting the capacity of a commonly-piped multi-compressor cooling system to maintain common suction pressure within preselected limits:
   (a) establishing high and low suction pressure limits for the cooling system;
   (b) measuring the suction pressure;
   (c) comparing the suction pressure to the established pressure limits;
   (d) generating an increase capacity signal if the suction pressure is above the established limits and a decrease capacity signal if the suction pressure is below the established limits;
   (e) incrementing a first register to determine which compressor has been deenergized the longest period of time in response to an increase capacity signal;
   (f) incrementing a second register to determine which compressor has been energized the longest period of time in response to a decrease capacity signal;
   (g) connecting each compressor in tandem to said first register and to said second register;
   (h) generating a energizing control signal to the compressor which has been deenergized the longest in response to incrementing said first register;
   (i) generating a deenergizing control signal to the compressor which has been energized the longest period of time in response to incrementing said second register;
   (j) energizing the compressor designated by said first register in response to said energizing signal; and
   (k) deenergizing the compressor designated by said second register in response to said deenergizing signal.

21. The method of claim 20, further comprising the step of inhibiting the incrementation of said first register in response to said increase capacity signal and said second register in response to said decrease capacity signal for a predetermined interval of time.

22. Apparatus for controlling the capacity of a preselected number of commonly piped compressors, comprising:
   (a) a pressure selecting means for establishing an operating suction pressure range having an upper limit and a lower limit;
   (b) a detection means for sensing the suction pressure in the system and cooperating with said pressure selecting means for determining when said pressure exceeds said upper limit and providing an increase capacity signal in response thereto, and when said pressure is below said lower limit and providing a decreased capacity signal in response thereto;
   (c) a sequencing means connected to said detection means for establishing a first-off first-on sequence for energizing the compressors in response to an increase capacity signal and for establishing a first-on first-off sequence for deenergizing the compressors in response to a decrease capacity signal, said sequencing means comprising counting means receiving said increase capacity and decrease capacity signals from said detection means and generating in response to each of said received signals an energizing or a deenergizing control signal, said energizing control signals occurring in a first-off first-on sequence and said deenergizing control signals occurring in a first-on first-off sequence; and
   (d) control circuit means connected to said sequencing means for connecting said energizing signals to said compressors in a first-off first-on sequence and disconnecting said energizing signals from said compressors in a first-on first-off sequence.

23. Apparatus for controlling the capacity of a preselected number of commonly piped compressors, comprising
  (a) a pressure selecting means for establishing an operating suction pressure range having an upper limit and a lower limit, said pressure selecting means having,
    (i) a voltage source, and
    (ii) at least one variable resistance means connected to said voltage source for supplying a voltage signal representative of each of said suction pressure range limits;
  (b) a detection means for sensing the suction pressure in the system and cooperating with said pressure selecting means for determining when said pressure exceeds said upper limit and providing an increase capacity signal in response thereto, and when said pressure is below said lower limit and providing a decrease capacity signal in response thereto, said detection means having,
    (i) a pressure transducer cooperating with the system suction pressure for measuring said pressure and generating an electrical signal representative of the measured pressure, and
    (ii) a comparator circuit receiving said voltage signals representative of said operating suction pressure range limits and said transducer signal for comparing said transducer signal with said pressure limit voltage signals for determining when said transducer signal indicates it is outside of said operating suction pressure range limits and generating increase capacity and decrease capacity signals in response thereto; and
  (c) a selection means for receiving said increase capacity signals and said decrease capacity signals and in respective response thereto, selectively energizing and deenergizing said compressors to provide a combination of energized compressors that exceed in number the preselected number of compressors in the system so that the capacity of the system matches the common pressure load.

24. Apparatus for controlling the capacity of a preselected number of commonly piped compressors, comprising:
  (a) a pressure selecting means for establishing an operating suction pressure range having an upper limit and a lower limit;
  (b) a detection means for sensing the suction pressure in the system and cooperating with said pressure selecting means for determining when said pressure exceeds said upper limit and providing an increase capacity signal in response thereto and when said pressure is below said lower limit and providing a decrease capacity signal in response thereto;
  (c) a time delay means for providing a time delay prior to energizing or deenergizing a subsequent compressor in the system, said time delay means comprising a timing circuit for receiving said increase and decrease capacity signals from said detection means and in response thereto generating delayed increase and decrease capacity signals; and
  (d) a selection means for receiving said delayed increase and decrease capacity signals and in respective response thereto, selectively energizing and deenergizing said compressors to provide a combination of energized compressors that exceed in number the preselected number of compressors in the system so that the capacity of the system matches the common pressure load.

* * * * *

UNITED STATES PATENT AND TRADEMARK OFFICE
CERTIFICATE OF CORRECTION

PATENT NO. : 4,612,776

DATED : September 23, 1986

INVENTOR(S) : Richard H. Alsenz

It is certified that error appears in the above—identified patent and that said Letters Patent is hereby corrected as shown below:

Column 9, line 7, delete "inequal" and substitute therefor --unequal--.

Column 12, line 54, delete "a" and substitute therefor --an--.

Column 13, line 3, delete "claims" and substitute therefor --claim--.

Column 14, line 22, delete "a" and substitute therefor --an--.

Signed and Sealed this

Thirteenth Day of January, 1987

*Attest:*

DONALD J. QUIGG

*Attesting Officer*  *Commissioner of Patents and Trademarks*